Figure 1:
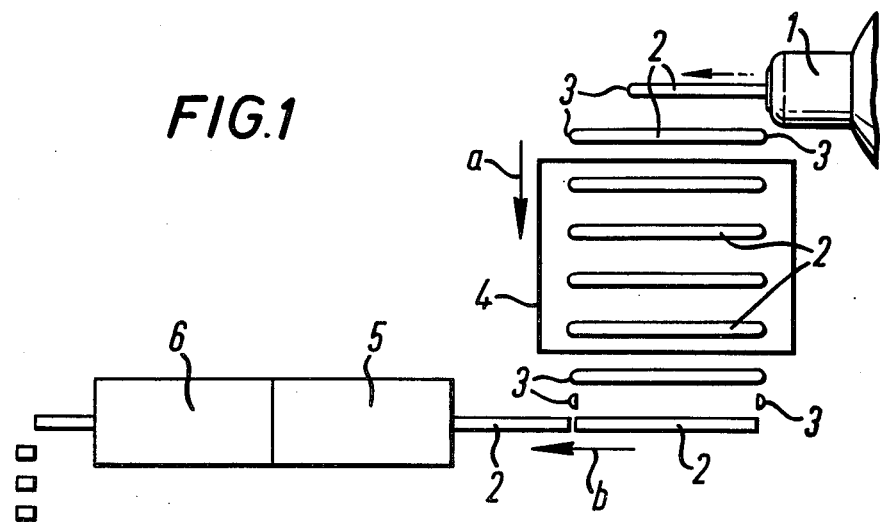

United States Patent [19]

Matthews et al.

[11] Patent Number: 4,473,592

[45] Date of Patent: Sep. 25, 1984

[54] PROCESS FOR PREPARING A FAT COATED MEAT PRODUCT

[75] Inventors: Bernard T. Matthews, Norwich; Alan J. Benstead, Aylesham; David J. Joll, Reepham; Sidney Thorp, Swanton Morley; David N. Wilson, Hellesdon, all of England

[73] Assignee: Bernard Matthews Limited, Norfolk, England

[21] Appl. No.: 88,353

[22] Filed: Oct. 26, 1979

[30] Foreign Application Priority Data

Oct. 31, 1978 [GB] United Kingdom ............... 42591/78

[51] Int. Cl.³ ........................... A23L 1/31; A23P 1/00
[52] U.S. Cl. .................... 426/302; 426/393; 426/513; 426/524; 426/641; 426/644
[58] Field of Search ................ 426/90, 92, 100, 129, 426/302, 307, 641, 644, 652, 393, 412, 513, 516, 517, 524; 62/380, 431, 63, 64, 373, 374; 198/472, 795; 414/156; 425/133.1

[56] References Cited

U.S. PATENT DOCUMENTS

| | | | |
|---|---|---|---|
| 2,174,924 | 10/1939 | McCleary | 426/393 X |
| 2,307,413 | 1/1943 | Loux | 414/156 X |
| 2,527,493 | 10/1950 | Condon | 426/641 |
| 2,551,463 | 5/1951 | Ramsbottom | 426/307 |
| 2,640,779 | 6/1953 | George | 426/644 X |
| 2,868,650 | 1/1959 | Hammerberg | 426/393 X |
| 3,502,234 | 3/1970 | Cook | 414/156 |
| 3,688,518 | 9/1972 | Goltsos | 62/63 X |
| 3,701,263 | 10/1972 | Barrett | 62/63 |
| 3,752,618 | 8/1973 | Moreland | 425/133.1 |
| 3,864,503 | 2/1975 | Steenolsen | 426/412 X |
| 3,881,029 | 4/1975 | Arenson | 426/92 X |
| 4,207,347 | 6/1980 | D'Atri et al. | 426/307 X |

FOREIGN PATENT DOCUMENTS 1452434 10/1976 United Kingdom .

Primary Examiner—Arthur L. Corbin
Attorney, Agent, or Firm—Parkhurst & Oliff

[57] ABSTRACT

A food product based on compacted meat, for example turkey, comprises a meat core 10, a mobile fat outer layer 11 and wrapping 12 which remains in place during cooking. The product is made by freezing the compacted core in long lengths which are advanced longitudinally through a fat applicator, superficial freezer and wrapping applicator.

3 Claims, 2 Drawing Figures

PROCESS FOR PREPARING A FAT COATED MEAT PRODUCT

DESCRIPTION

This invention relates to the production of a meat-based product. The meat for which the present process is particularly designed is turkey meat and the process will be hereinafter described with reference to turkey meat. It should be borne in mind however that the invention and the process and apparatus in accordance therewith can be applied to other meats.

In broad aspect a process in accordance with the present invention comprises the steps of forming the turkey meat into an elongate compacted billet of substantial length, freezing the billet and thereafter advancing the frozen billet longitudinally, i.e. along its own axis. The billet during its longitudinal advance is coated with fat, superficially refrozen to solidify the fat and thereafter cut into the desired lengths.

In accordance with a preferred feature of the invention a first billet is propelled into and through a freezer for carrying out the superficial freezing operation by an end-on abutment force applied by a second billet behind it.

Preferably the billets are frozen by moving them transversely of their lengths through a freezer. From the freezer in such an arrangement each billet is moved again transversely to the input of a conveyor device along which the billet is moved longitudinally.

Figure 2:
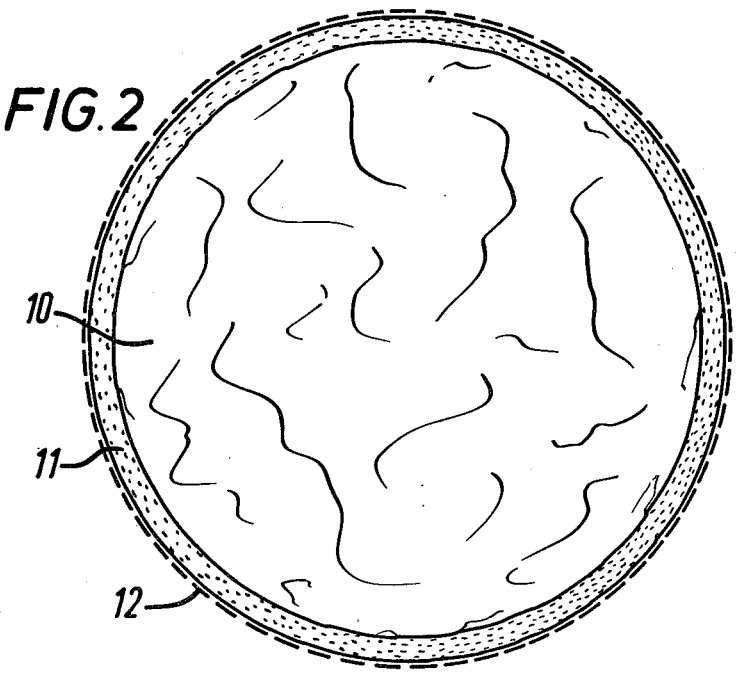

A process in accordance with the invention will now be described by way of example and with reference to the accompanying drawings in which:

FIG. 1 is a diagrammatic representation of the process and apparatus of the invention, and FIG. 2 is a section through a product in accordance with the invention.

Oven-ready turkey carcasses are manually deboned on a conveyor line to remove the skin and meat. The deboned meat is then mechanically massaged with salt to produce salt soluble proteins which enhance the binding properties of the meat. This preliminary process stage is not illustrated.

The meat is then extruded from a device 1 into a cylindrical billet 2 of substantial length typically 8 meters and typically 10 cm in diameter. The extrusion device wraps the billet in a plastic casing which wrapping operation rounds the end parts 3 of the billet.

The wrapped billet then moves transversely in the direction of arrow 'a' of its length into and through a freezing device 4. The freezing device is a tank of brine (calcium chloride solution) and movement of the brine moves the billets. The movement of the brine may be controlled and assisted by providing a weir in the tank. During movement of the billets through the tank freezing brine is caused to rain on the billets. It will be appreciated that the billet has to be wrapped during this freezing operation to avoid contamination of the meat by the calcium chloride.

The billet 2 is extracted from the downstream end of the tank as a rigid frozen "log". The brine is then drained from the billet and the billet washed. The rounded end parts are cut off and the casing stripped from the billet.

The stripped right cylindrical frozen billet 2 is then delivered to a conveyor moving in the direction of the arrow 'b' which is at right angles to the direction of the arrow 'a' and is thus the axial direction of the billet. The conveyor is made of longitudinally spaced rollers each roller being mounted for rotation about a generally horizontal axis.

Each roller is of concave form so as to define a track with a radius approximately corresponding to that of the billet. Each roller at the input part of the conveyor is mounted on an upstanding post. Some of the rollers will be idle but drive for the billets may be provided by driving selected rollers. Positive drive for the billets is usually required however and this is conveniently provided by a toothed wheel driven to rotate about a horizontal axis. The teeth successively dig into the peripheral surface of the billet thereby propelling the billet along the conveyor.

From the input end each billet moves into a coating device 5 which coats the billet with fat to a depth of approximately 6 mm. The coating device, in principle, comprises a housing defining a through passage for the billet, annular extrusion means surrounding the passage for coating the peripheral surface of the billet with liquid fat and means for fitting a protective sleeve over the fat-coated billet. Upper and lower concave drive rollers smooth the sleeve by applying constant pressure to the liquid fat trapped between the sleeve and the billet. Preferably the sleeve is of heat shrinkable plastics material and a heat shrinking operation is carried out immediately after the fitting of the sleeve. The heat shrinking ensures the evenness and coherence of the fat coating and the tight and secure fit of the sleeve.

The billet fat coated and sleeved is moved along the conveyor into a freezing device 6 for superficially freezing the fat coating. This device is conveniently a liquid nitrogen freezer and will hereinafter be described as such. After some eighteen inches travel through the freezer the fat hardens sufficiently to allow support by a roller of a conveying device without marking the billet. Typically the liquid nitrogen freezer is of the order of 10 ft. long and contains a conveyor device comprising longitudinally spaced rollers as described above.

It should be noted that the billet must extend unsupported between entry to the extrusion device and engagement by the first roller in the nitrogen freezer. This makes long billets necessary. Typically the spacing between conveyor elements will be of the order of a few feet, say 3 ft.

After emergence from the nitrogen freezer the billet is cut to the commercially desirable lengths, say 72 to 75 millimeters. This cutting is preferably by a reciprocating saw blade.

In order to freeze the fat coating within an economic length of nitrogen freezer a slow speed of billet advance is necessary. However, slow speeds mean slow product output and in order to reconcile effectiveness with economy it is proposed to run two or more conveyors in parallel each through a fat coating device and a nitrogen freezer. In such a system it is proposed to provide a plurality of reciprocating saw blades.

The billet moving through the coating device and freezer can be propelled by positive drive means adjacent the coating device input but preferably will be propelled by the driven billet behind it. That is to say the front end of a rear driven billet buts up against the rear end of a front billet to drive the latter.

A meat-based product in accordance with the invention and produced by the method described above is illustrated, actual size, in FIG. 2. The unfrozen product ready to roast is characterised by a relatively hard and dense core 10 of compacted meat, for example turkey, a much less dense outer layer 11 of fat applied by extrusion of a liquid fat emulsion in the manner set out above and an outer layer of shrunk wrapping 12 made of a non-toxic polymer such as a polyester. This wrapping remains on the product during roasting. It will be appreciated that when the product is unfrozen the fat will return to its mobile state and the wrapping 12 is necessary to hold the layer 11 intact and in position. During roasting the fat is, of course, necessary to prevent burning of the meat. The layer of fat thus retained and also by virtue of its manner of application is coherent and even.

We claim:

1. A process for producing a meat-based product having a meat core of substantially constant cross-section of relatively dense compacted meat and an outer coating of fat which is mobile in the unfrozen state, said process comprising the sequential steps of:
   (1) forming the meat into a first elongate billet;
   (2) freezing the thus formed first billet solid;
   (3) forming a second elongate frozen billet similar to the first billet;
   (4) driving the second frozen billet longitudinally into end-on abutting relationship with the first frozen billet and continuing the said drive thereby longitudinally advancing the first frozen billet;
   (5) extruding, with an extrusion device, a layer of a fluid fat onto the first frozen billet during the longitudinal advance;
   (6) sheathing the fat-coated first billet with a protective plastic sleeve;
   (7) superficially freezing, in a freezer having a first roller, the fat-coated, sheathed first billet to freeze the fat coating thereon, the billet being unsupported during the advance between entry to the extrusion device and engagement by the first roller in the freezer, and
   (8) cutting the thus coated and sheathed frozen first billet into a predetermined length,
      to produce a frozen product having a core of meat of substantially constant cross-section, an outer and substantially uniform coating of fat, and an overlying plastic sheath.

2. A process as claimed in claim 1 wherein each billet is frozen by moving it tranversely of its length through a freezing tank.

3. A method as claimed in claim 1 wherein each billet, after forming and prior to freezing, is wrapped thereby rounding the billet end parts and wherein after freezing the wrapping is removed and the rounded end parts are cut off.

* * * * *